US012589598B2

(12) United States Patent
Yamamoto

(10) Patent No.: US 12,589,598 B2
(45) Date of Patent: Mar. 31, 2026

(54) PRINTING DEVICE AND PRINTING METHOD

(71) Applicant: SEIKO EPSON CORPORATION, Tokyo (JP)

(72) Inventor: Yoshiaki Yamamoto, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 161 days.

(21) Appl. No.: 18/604,559

(22) Filed: Mar. 14, 2024

(65) Prior Publication Data

US 2024/0308236 A1 Sep. 19, 2024

(30) Foreign Application Priority Data

Mar. 16, 2023 (JP) ................................ 2023-042039

(51) Int. Cl.
*B41J 2/21* (2006.01)

(52) U.S. Cl.
CPC ........... *B41J 2/2135* (2013.01); *B41J 2/2142* (2013.01)

(58) Field of Classification Search
CPC ...... B41J 2/2135; B41J 2/2142; B41J 19/145; B41J 29/393; B41J 2/2132; B41J 2/04505; B41J 2/145; B41J 29/38
See application file for complete search history.

(56) References Cited

U.S. PATENT DOCUMENTS 6,896,354 B1 * 5/2005 Uchisako .................. B41J 3/54
347/37
2021/0402758 A1 * 12/2021 Ohara .................. B41J 2/16579

FOREIGN PATENT DOCUMENTS

JP 2016-221835 A 12/2016

* cited by examiner

*Primary Examiner* — Jannelle M Lebron
(74) *Attorney, Agent, or Firm* — Spencer Fane LLP

(57) ABSTRACT

A printing device includes a control unit, and the print head including a first nozzle row, a second nozzle row, a third nozzle row, and a fourth nozzle row arrayed along a second direction. A test pattern is printed by a main scan and a sub-scan, and the control unit prints the test pattern so as to include a first line group, a second line group, a third line group, and a fourth line group, and prints the test pattern so that the first line group and the third line group and the second line group and the fourth line group are shifted from each other by a first distance shorter than the nozzle interval in the first direction, and the first line group and the third line group overlap and the second line group and the fourth line group overlap when viewed from the second direction.

6 Claims, 7 Drawing Sheets

PRINTING DEVICE AND PRINTING METHOD

The present application is based on, and claims priority from JP Application Serial Number 2023-042039, filed Mar. 16, 2023, the disclosure of which is hereby incorporated by reference herein in its entirety.

BACKGROUND

1. Technical Field

The present disclosure relates to a printing device and a printing method for printing a test pattern.

2. Related Art

In an inkjet printer that performs printing using a print head having a nozzle row in which a plurality of nozzles configured to eject liquid are arranged, an ejection failure may occur for each nozzle. The ejection failure includes, in addition to dot omission in which the liquid dot is not ejected from the nozzle due to clogging of the nozzle, a landing position shift in which the landing position of the dot is not ideal, dot thickening or dot thinning in which the ejected dot is too large or too small, and the like.

In addition, a technique is disclosed in which a test pattern for identifying an ejection port in which an ejection failure has occurred is recorded by a recording head, and an image data obtained by reading the test pattern with a reading device is analyzed to specify the ejection port in which the ejection failure has occurred (see Japanese Patent Application Laid-Open No. 2016-221835). According to the test pattern of JP-A-2016-221835, each linear image recorded by each of the plurality of nozzles in the nozzle row is recorded side by side at the nozzle interval in the conveyance direction of a recording medium.

At the time of reading a document on which a test pattern is recorded by a reading device, a conveyance error such as a variation in a conveyance speed of the document occurs, and a reading error may appear in a thickness or an interval of a line image in obtained image data. Therefore, when analyzing the image data, the ejection failure cannot be accurately detected unless the image data is subjected to correction for removing such a reading error and then analyzed.

However, in the known test pattern, no pattern is recorded between the nozzles. Therefore, even if image data obtained by reading a test pattern is obtained, the presence or absence of a reading error is unknown for such a region where nothing is recorded in correspondence with a space between the nozzles, and the correction described above is difficult to appropriately perform on the image data.

In addition, in the known test pattern, in a case where the document on which the test pattern is recorded is read in an inclined state, it is often difficult to evaluate the thickness of the line image in comparison with other line images, and thus, it is difficult to accurately detect the thickening and thinning of the dot.

In view of such a problem, it is necessary to print a test pattern that contributes to improvement of detection accuracy of ejection failure.

SUMMARY

A printing device includes a print head including a first nozzle row, a second nozzle row, a third nozzle row, and a fourth nozzle row which are nozzle rows including a plurality of nozzles configured to eject liquid and arrayed in a first direction at a predetermined nozzle interval, and are arranged along a second direction intersecting the first direction, a carriage provided with the print head and configured to reciprocate along the second direction, a moving unit configured to perform relative movement between a medium and the print head in the first direction, and a control unit configured to cause the print head to eject liquid from the plurality of nozzles onto the medium to print a test pattern. The test pattern is printed by a main scan by the print head ejecting liquid from the plurality of nozzles along with the movement of the carriage along the second direction and a sub-scan that is the relative movement in the first direction, the control unit is configured to print the test pattern so as to include a first line group formed by the first nozzle row, a second line group formed by the second nozzle row, a third line group formed by the third nozzle row, and a fourth line group formed by the fourth nozzle row which are a line group including a plurality of lines formed by liquid ejection from each of the plurality of nozzles of the nozzle rows, and print the test pattern such that the first line group and the third line group and the second line group and the fourth line group are shifted from each other in the first direction by a first distance shorter than the nozzle interval, and the first line group and the third line group overlap and the second line group and the fourth line group overlap when viewed from the second direction.

In a printing method for printing a test pattern by causing a print head that includes nozzle rows including a plurality of nozzles configured to eject liquid and arrayed in a first direction at a predetermined nozzle interval, to eject liquid from the plurality of nozzles to a medium, the print head including a first nozzle row, a second nozzle row, a third nozzle row, and a fourth nozzle row which are the nozzle rows and arranged along a second direction intersecting the first direction, the printing method includes a printing step of printing the test pattern by a main scan by the print head moving along the second direction and ejecting liquid from the plurality of nozzles and a sub-scan that is relative movement between the medium and the print head in the first direction. The printing step includes printing the test pattern so as to include a first line group formed by a first nozzle row, a second line group formed by a second nozzle row, a third line group formed by a third nozzle row, and a fourth line group formed by a fourth nozzle row which are a line group including a plurality of lines formed by liquid ejection from each of the plurality of nozzles of the nozzle rows, and printing the test pattern such that the first line group and the third line group and the second line group and the fourth line group are shifted from each other in the first direction by a first distance shorter than the nozzle interval, and the first line group and the third line group overlap and the second line group and the fourth line group overlap when viewed from the second direction.

DESCRIPTION OF EMBODIMENTS

Embodiments of the present disclosure will be described below with reference to the drawings. Note that each figure is merely illustrative for describing the present embodiment. Since the drawings are illustrative, proportions, shapes, and shading may not be precise, consistent, or may be partially omitted.

1. Device Configuration

Figure 1:
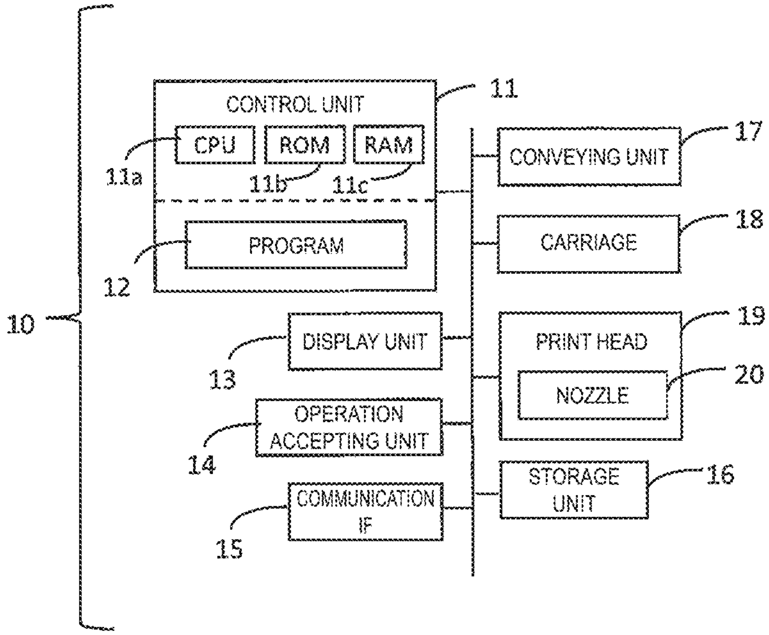
FIG. 1 is a diagram simply illustrating a device configuration.

FIG. 1 simply illustrates a configuration of a printing device 10 according to the present embodiment. The printing device 10 includes a control unit 11, a display unit 13, an operation accepting unit 14, a communication IF 15, a storage unit 16, a conveying unit 17, a carriage 18, a print head 19, and the like. IF is an abbreviation for interface. The control unit 11 is configured by including one or a plurality of ICs each having a CPU 11*a* serving as a processor, a ROM 11*b*, a RAM 11*c*, and the like, other non-volatile memories, and the like.

In the control unit 11, the processor, that is, the CPU 11*a*, executes arithmetic processing according to one or more programs 12 stored in the ROM 11*b*, other memories, or the like using the RAM 11*c* or the like as a work area, thereby controlling the printing device 10. Also, the processor is not limited to a single CPU, and a configuration in which the processing is performed by a hardware circuit such as a plurality of CPUs, an ASIC, or the like may be adopted, or a configuration in which a CPU and a hardware circuit cooperate to perform the processing may be adopted.

The display unit 13 is a means that displays visual information and is configured by, for example, a liquid crystal display, an organic EL display, or the like. The display unit 13 may have a configuration including a display and a drive circuit for driving the display. The operation accepting unit 14 is a means that accepts an operation performed by a user and is realized by, for example, a physical button, a touch panel, a mouse, a keyboard, or the like. Of course, the touch panel may be realized as one function of the display unit 13.

The display unit 13 and the operation accepting unit 14 may be part of the configuration of the printing device 10, or may be peripheral devices externally attached to the printing device 10. The communication IF 15 is a general term for one or a plurality of IFs for connecting the printing device 10 to an external device in a wired or wireless manner in accordance with a predetermined communication protocol including known communication standards. The external device is, for example, various communication devices such as a personal computer, a server, a smartphone, and a tablet terminal.

The storage unit 16 is configured by, for example, a storage device such as a hard disk drive, or a solid state drive. The storage unit 16 may be part of the memory included in the control unit 11. The storage unit 16 may be understood as part of the control unit 11. The storage unit 16 stores various types of information required for controlling the printing device 10.

The conveying unit 17 is a means that convey a medium in a predetermined "conveyance direction", and includes a rotating roller and a motor for rotating the roller. Upstream and downstream in the conveyance direction are hereinafter simply referred to as upstream and downstream. The medium is typically paper, but in addition to paper, various materials that can be a target of printing with a liquid, such as fabric and film, can be adopted as the medium. The conveyance direction is also referred to as a "sub-scanning direction". The conveying unit 17 may be a mechanism that conveys the medium on a belt or a pallet. The sub-scanning direction corresponds to a "first direction", and the conveying unit 17 corresponds to a specific example of a "moving unit" that performs relative movement of the medium and the print head 19 in the first direction. This relative movement is also referred to as "sub-scan".

The carriage 18 is a mechanism that can reciprocate in a predetermined "main scanning direction" upon receiving power from a carriage motor (not illustrated). The main scanning direction and the sub-scanning direction intersect each other. The intersection between the main scanning direction and the sub-scanning direction may be understood as being orthogonal or substantially orthogonal. The main scanning direction corresponds to a "second direction". The print head 19 is mounted on the carriage 18. Accordingly, the print head 19 reciprocates along the main scanning direction together with the carriage 18. Movement of the print head 19 and movement of the carriage 18 are synonymous.

The print head 19 has a plurality of nozzles 20 for ejecting liquid dots. The dots are droplets. In the following description, the liquid is assumed to be ink, but the print head 19 can also eject liquid other than ink. The print head 19 performs ink ejection based on print data for printing an image. As is known, the control unit 11 controls application of drive signals to drive elements (not illustrated) included in each of the nozzles 20 in accordance with the print data to cause each of the nozzles 20 to eject or not to eject the dots, thereby printing the image on the medium. The print head 19 can eject each color ink such as cyan (C) ink, magenta (M) ink, yellow (Y) ink, and black (K) ink. Of course, the ink ejected by the print head 19 is not limited to CMYK.

Figure 2:
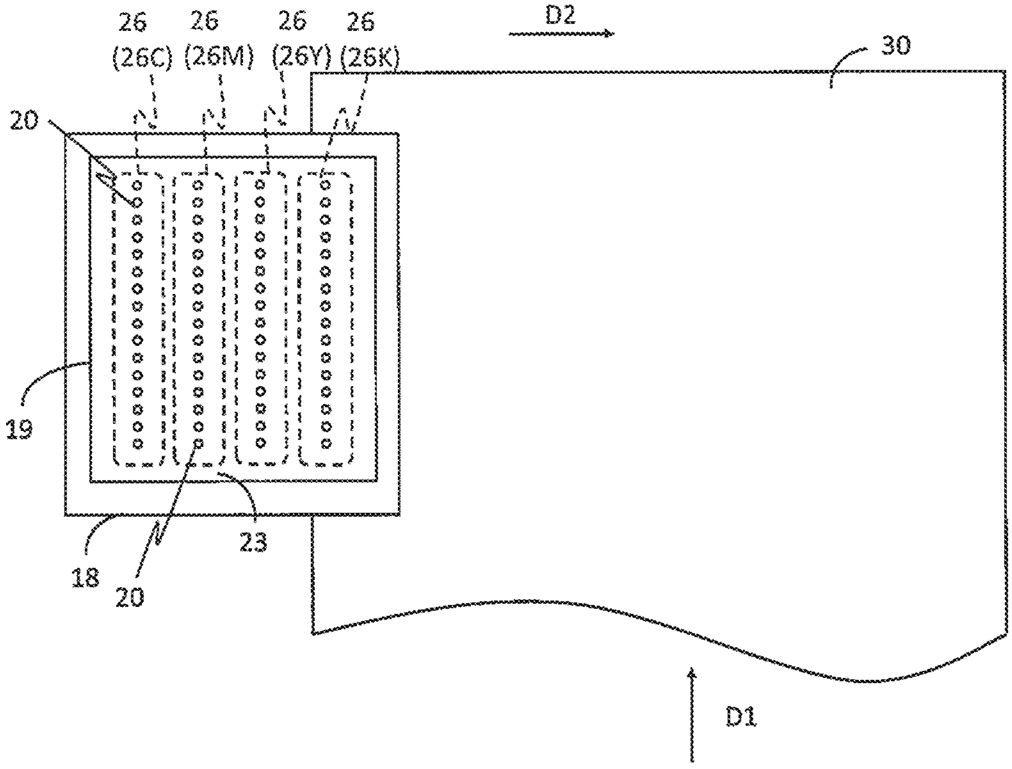
FIG. 2 is a diagram illustrating a relationship between a medium and a print head from above.

FIG. 2 simply illustrates a relationship between a medium 30 and the print head 19 from above. The print head 19 mounted on the carriage 18 performs, together with the carriage 18, a forward movement that is a movement from one end to the other end in a main scanning direction D2 and a backward movement that is a movement from the other end to the one end. FIG. 2 illustrates an example of arrangement of the nozzles 20 on a nozzle surface 23. The nozzle surface 23 is a lower surface of the print head 19 and is a surface facing the medium 30. Individual small circles in the nozzle surface 23 represent individual nozzles 20.

The print head 19 includes nozzle rows 26 for each ink color in a configuration in which the print head 19 receives supply of ink of each color from a liquid holding means (not illustrated) referred to as ink cartridges, ink tanks, or the like and ejects them through the nozzles 20. FIG. 2 is an example of the print head 19 that ejects CMYK inks. The nozzle row 26 including the nozzles 20 that eject C ink is a nozzle row 26C. Similarly, the nozzle row 26 including the nozzles 20 that eject M ink is a nozzle row 26M, the nozzle row 26 including the nozzles 20 that eject Y ink is a nozzle row 26Y, and the nozzle row 26 including the nozzles 20 that eject K ink is a nozzle row 26K.

In the example of FIG. 2, the nozzle rows 26C, 26M, 26Y, and 26K are arranged along the main scanning direction D2. Also, the plurality of nozzle rows 26 for each color are arranged at the same position in a sub-scanning direction D1. One nozzle row 26 includes a plurality of nozzles 20 in which a "nozzle interval", which is an interval between the nozzles 20 in the sub-scanning direction D1, is constant or substantially constant.

The direction in which the plurality of nozzles 20 forming the nozzle row 26 are arranged is also referred to as a "nozzle arranging direction". In the example of FIG. 2, the nozzle arranging direction is parallel to the sub-scanning direction D1. Accordingly, it can be said that the plurality of nozzles 20 forming the nozzle row 26 are arranged in the sub-scanning direction D1. In such a configuration, the nozzle arranging direction is orthogonal to the main scanning direction D2. However, the nozzle arranging direction may be oblique with respect to the sub-scanning direction D1 instead of parallel thereto. Regardless of whether or not the nozzle arranging direction is parallel to the sub-scanning direction D1, it can be said that the nozzle arranging direction intersects the main scanning direction D2, and it can be said that the plurality of nozzles 20 forming the nozzle row 26 are arranged at a predetermined nozzle interval in the sub-scanning direction D1. Accordingly, in the present embodiment, even if the nozzle arranging direction is oblique to the sub-scanning direction D1, the plurality of nozzles 20 forming the nozzle row 26 may be interpreted as also being arranged in the sub-scanning direction D1.

The operation in which the print head 19 ejects the ink together with the movement of the carriage 18 along the main scanning direction D2 is referred to as "main scan" or "pass". In addition, an operation in which the conveying unit 17 conveys the medium 30 downstream by a predetermined distance between passes is referred to as "paper feeding". The paper feeding is a kind of sub-scan. By controlling the print head 19, the carriage 18, and the conveying unit 17 in this manner, the control unit 11 executes passing and paper feeding to print a two-dimensional image on the medium 30. In the present embodiment, the control unit 11 causes the print head 19 to eject liquid from the nozzle 20 to the medium 30 to print a test pattern. The test pattern is a type of image printed in this manner.

The print head 19 has at least four nozzle rows 26. In order to identify certain four nozzle rows 26 included in the print head 19, they are also referred to as a first nozzle row, a second nozzle row, a third nozzle row, and a fourth nozzle row, respectively. For example, the nozzle row 26C may be referred to as a first nozzle row, the nozzle row 26M may be referred to as a second nozzle row, the nozzle row 26Y may be referred to as a third nozzle row, and the nozzle row 26K may be referred to as a fourth nozzle row. The first nozzle row, the second nozzle row, the third nozzle row, and the fourth nozzle row may not be arranged in this order in the main scanning direction D2. Thus, for example, the nozzle row 26M may be referred to as a first nozzle row, the nozzle row 26Y may be referred to as a second nozzle row, the nozzle row 26C may be referred to as a third nozzle row, and the nozzle row 26K may be referred to as a fourth nozzle row. That is, any correspondence relationship may be adopted as the correspondence relationship among the first nozzle row, the second nozzle row, the third nozzle row, and the fourth nozzle row and the nozzle rows 26C, 26M, 26Y, and 26K.

The sub-scan may not be performed by the conveying unit 17 conveying the medium 30, but instead may be performed by the print head 19 moving upstream in parallel with the sub-scanning direction D1. That is, the printing device 10 may have a mechanism that supports the carriage 18 on which the print head 19 is mounted so as to be able to reciprocate not only in the main scanning direction D2 but also in the sub-scanning direction D1, and may execute printing on the medium 30 by the print head 19 two-dimensionally moving on the stationary medium 30. In this case, a mechanism that moves the carriage 18 along the sub-scanning direction D1 corresponds to a moving unit that performs relative movement between the media 30 and the print head 19 in the first direction.

The configuration of the printing device 10 illustrated in FIG. 1 may be realized by one printer, or may be realized by a plurality of devices communicably connected to each other. That is, the printing device 10 may be a printing system 10 in actuality. The printing system 10 includes, for example, a printing control device that functions as the control unit 11 and the storage unit 16, and a printer that includes the conveying unit 17, the carriage 18, the print head 19, and the like. A printing method according to the present embodiment is realized by such a printing device 10 or printing system 10.

2. Test Pattern Printing

Figure 3:
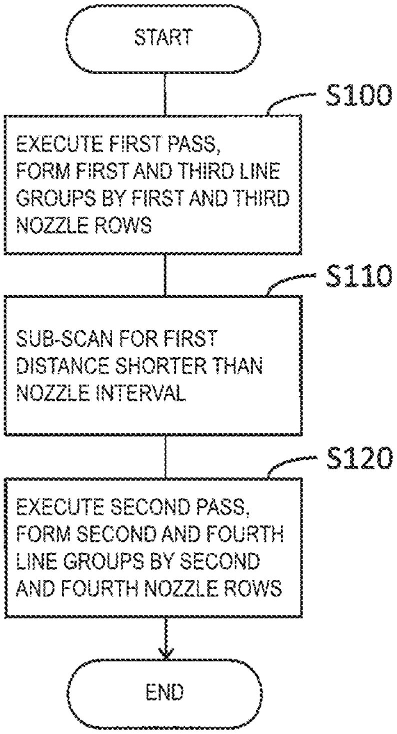
FIG. 3 is a flowchart showing a printing step of a test pattern.

FIG. 3 is a flowchart illustrating a printing step of a test pattern executed by the control unit 11 according to the program 12. Although not illustrated in the flowchart, the control unit 11 acquires print data for printing the test pattern prior to the printing step of the test pattern. A test pattern image data that is image data expressing a test pattern is stored in advance, for example, in the storage unit 16. Of course, the control unit 11 may acquire the test pattern image data from an external device through the communication IF 15.

The control unit 11 appropriately performs various types of image processing such as resolution conversion process, color conversion process, and halftone process on the test pattern image data to generate print data. The print data here is assumed to be data in which ejection or non-ejection of dots is defined for each pixel and for each CMYK ink color. The ejection of dots is also referred to as dot-on, and non-ejection of dots is also referred to as dot-off.

In the printing step of a test pattern, the control unit 11 prints the test pattern on the medium 30 based on the print data for printing the test pattern. The control unit 11 schematically prints the test pattern such that the test pattern includes a first line group formed by a first nozzle row, a second line group formed by a second nozzle row, a third line group formed by a third nozzle row, and a fourth line group formed by a fourth nozzle row, which are line groups having a plurality of lines formed by liquid ejection from each nozzle 20 of the nozzle row 26, the first line group and the third line group are shifted from the second line group and the fourth line group by a first distance shorter than the nozzle interval in the sub-scanning direction D1, and the first line group and the third line group overlap and the second line group and the fourth line group overlap when viewed from the main scanning direction D2.

In step S100, the control unit 11 controls the carriage 18 and the print head 19 to execute the first pass. In the present embodiment, a pass executed first of the two passes for printing a test pattern is referred to as a first pass, and a pass executed later is referred to as a second pass. In the first pass, control unit 11 causes ink to be ejected from the first nozzle row and the third nozzle row to form the first line group and the third line group on the medium 30.

In step S110, the control unit 11 controls the moving unit, here, the conveying unit 17 to execute the sub-scan by the "first distance" shorter than the nozzle interval, that is, the paper feeding of the medium 30.

In step S120, the control unit 11 controls the carriage 18 and the print head 19 to execute the second pass. For example, if the first pass is ink ejection accompanied by forward movement, the second pass is ink ejection accompanied by backward movement in a direction opposite to the first pass. Alternatively, in order to prevent the deviation between the printing by the forward movement and the printing by the backward movement of the carriage 18 from appearing in the test pattern, the first pass and the second pass may be unified to one of the forward movement and the backward movement.

In the second pass, the control unit 11 causes ink to be ejected from the second nozzle row and the fourth nozzle row to form the second line group and the fourth line group on the medium 30. As described above, in the printing step of the test pattern, the test pattern is printed by two main scans and one sub-scan executed between the two main scans.

Figure 4:
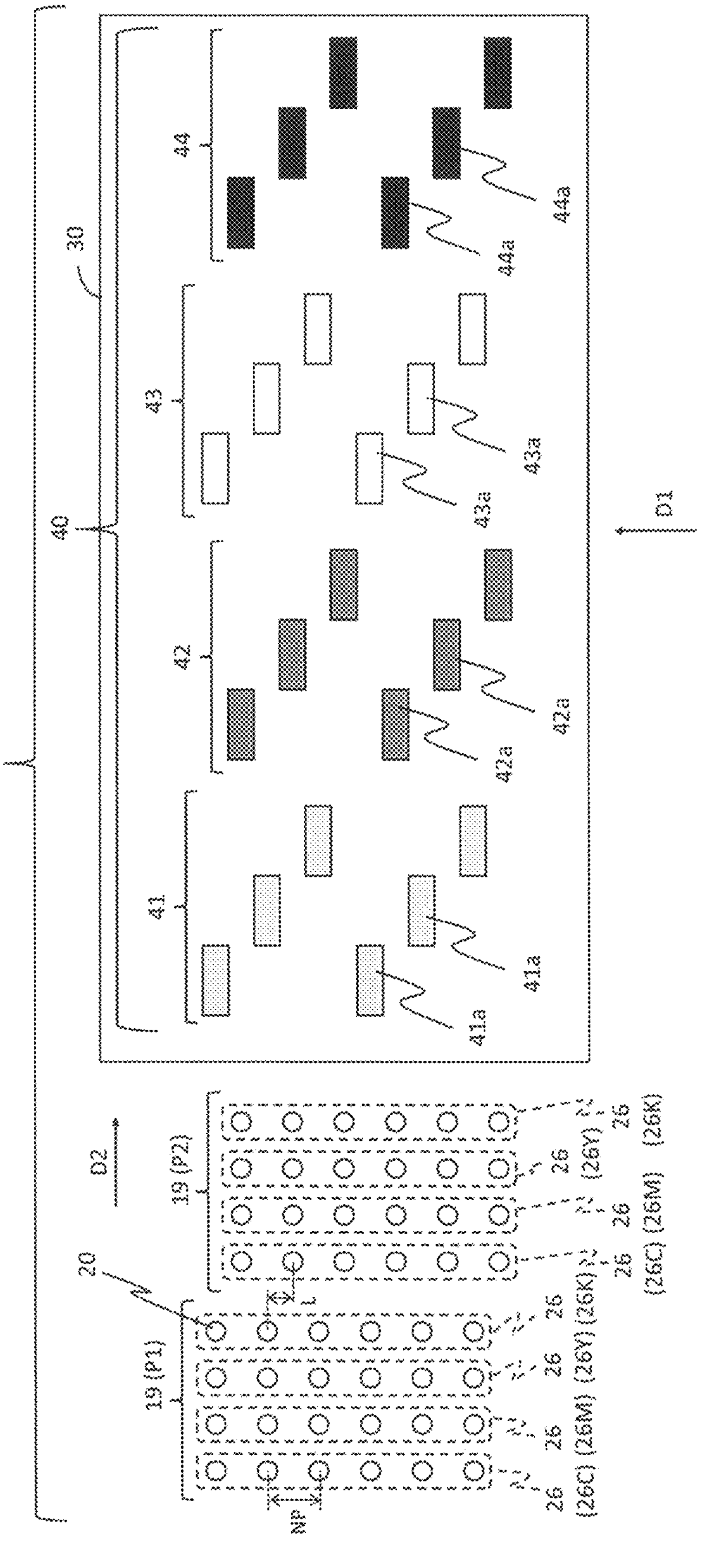
FIG. 4 is a diagram illustrating an example of a test pattern of the present embodiment.

FIG. 4 shows an example of the test pattern 40 printed on the medium 30 as a result of steps S100 to S120. FIG. 4 also shows how the positional relationship between the print head 19 and the medium 30 changes in the sub-scanning direction D1. Reference numeral NP indicates a nozzle interval NP between the nozzles 20 adjacent to each other in the sub-scanning direction D1, and reference numeral L indicates a predetermined first distance L shorter than the nozzle interval NP. As an example, the control unit 11 executes step S110 with the first distance L as a distance of half of the nozzle interval NP.

"P1" shown in parentheses next to reference numeral 19 means the first pass P1 of step S100, and "P2" means the second pass P2 of step S120. That is, FIG. 4 illustrates that the positional relationship between the print head 19 and the medium 30 at the time of executing the first pass P1 and the positional relationship between the print head 19 and the medium 30 at the time of executing the second pass P2 are changed by the first distance L by the sub-scan of step S110.

In FIG. 4, as an example, it is assumed that the nozzle row 26C is a first nozzle row, the nozzle row 26M is a second nozzle row, the nozzle row 26Y is a third nozzle row, and the nozzle row 26K is a fourth nozzle row. In the first pass P1, the first line group 41 is formed on the medium 30 by the nozzle row 26C ejecting the C ink from each nozzle 20, and the third line group 43 is formed on the medium 30 by the nozzle row 26Y ejecting the Y ink from each nozzle 20. The first line group 41 is a set of a plurality of lines 41*a* formed by the C ink ejected by each nozzle 20 of the nozzle row 26C. The third line group 43 is a set of a plurality of lines 43*a* formed by the Y ink ejected by each nozzle 20 of the nozzle row 26Y.

The lines 41*a* and 43*a* and lines 42*a* and 44*a* to be described later are line images each having a length component in the main scanning direction D2 formed by one nozzle 20. Such a line is suitably a solid line, but may be, for example, a broken line. The line may be referred to as a ruled line. Each line in the same line group is arranged in the sub-scanning direction D1 at an interval corresponding to the nozzle interval NP, similarly to each nozzle 20 of the nozzle row 26 forming the line group. The first line group 41 and the third line group 43 are separated in the main scanning direction D2, and are formed at the same position in the sub-scanning direction D1. That is, the first line group 41 and the third line group 43 overlap when viewed from the main scanning direction D2. The term "overlapped" as used herein may include not only a state in which they are completely overlapped but also a state in which they are partially overlapped.

Similarly, in the second pass P2, the second line group 42 is formed on the medium 30 by the nozzle row 26M ejecting the M ink from each nozzle 20, and the fourth line group 44 is formed on the medium 30 by the nozzle row 26K ejecting the K ink from each nozzle 20. The second line group 42 is a set of a plurality of lines 42*a* formed by the M ink ejected by each nozzle 20 of the nozzle row 26M. The fourth line group 44 is a set of a plurality of lines 44*a* formed by the K ink ejected by each nozzle 20 of the nozzle row 26K. The second line group 42 and the fourth line group 44 are separated in the main scanning direction D2, and are formed at the same position in the sub-scanning direction D1. That is, the second line group 42 and the fourth line group 44 overlap when viewed from the main scanning direction D2.

As described above, the test pattern 40 includes the first line group 41, the third line group 43, the second line group 42, and the fourth line group 44. As is apparent from FIG. 4, the first line group 41 and the third line group 43, and the second line group 42 and the fourth line group 44 are formed at positions shifted by the first distance L in the sub-scanning direction D1 due to the sub-scan in step S110. Therefore, in the present embodiment, when the entire test pattern 40 is viewed, the line image is printed at a density twice the density of the nozzle 20 in the sub-scanning direction D1.

The first line group 41, the third line group 43, the second line group 42, and the fourth line group 44 are arranged along the main scanning direction D2. In the example of FIG. 4, the first line group 41, the second line group 42, the third line group 43, and the fourth line group 44 are arranged in this order from one end side to the other end side in the main scanning direction D2, but the arrangement order of the plurality of line groups in the main scanning direction D2 is not necessarily as illustrated.

As can be seen from FIG. 4, the lines adjacent in the sub-scanning direction D1 in the same line group are formed shifted in the main scanning direction D2. That is, in step S100 and step S120, the control unit 11 controls the print head 19 to form the lines formed by the nozzles 20 adjacent to each other in the sub-scanning direction D1 within the nozzle row 26 to be shifted in the main scanning direction D2. This makes it easy to grasp each line.

Although not illustrated in FIG. 4, depending on the condition of each nozzle 20 when the test pattern 40 is printed, the ejection failure as described above appears in some of the lines 41*a*, 42*a*, 43*a*, and 44*a* on the medium 30.

3. Description and Effect after Test Pattern Printing

Figure 5A:
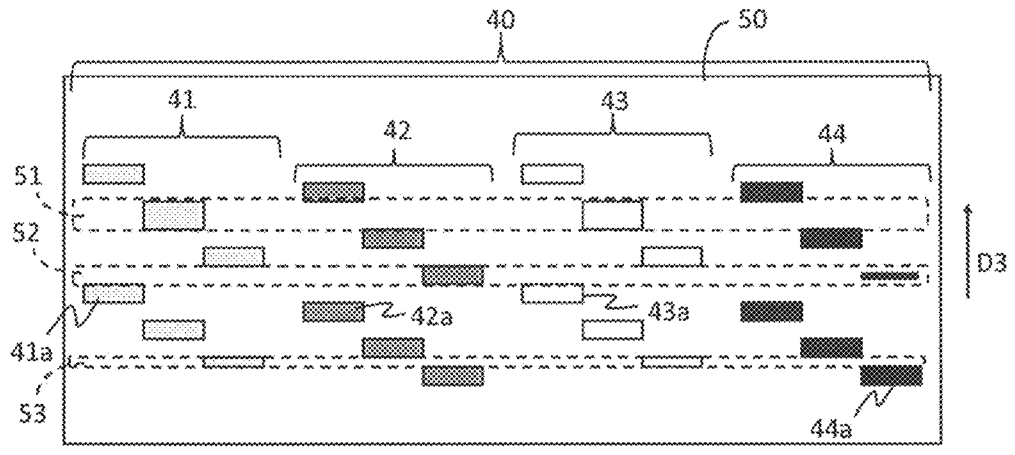
FIG. 5A is a diagram illustrating scan data of a test pattern according to the present embodiment.

FIG. 5A illustrates scan data 50 of a medium 30 on which a test pattern 40 has been printed. The user sets the medium 30 on which the test pattern 40 has been printed by the printing device 10 as a document in a scanner (not illustrated), and causes the medium 30 to be read. As a result, the scanner generates image data serving as a reading result of the test pattern 40. The image data serving as the reading result is the scan data 50.

A device that acquires the scan data 50 and processes or analyzes the scan data 50 is referred to as an image processing device for convenience. The entity of the image processing device may be a scanner, the printing device 10, or the external device described above. The image processing device can detect ejection failure of each nozzle 20 by analyzing the scan data 50. The analysis and evaluation of the scan data 50 may be visually performed by a user.

Also in FIG. 5A, the same reference numerals as those in FIG. 4 are used for the test pattern 40. The direction D3 is a direction D3 in which the document is conveyed when the scanner reads the document. Here, the scanner is assumed to be a so-called seed feed type product that reads a document by an image sensor while conveying the document. However, the scanner may be a so-called flatbed type product that reads a document held still on a document table. In this case, a moving direction of a reading means such as a sensor that moves with respect to the document in order to read the document may be regarded as the direction D3. In the following, the conveyance error of the document by the scanner may be read as such a movement error of the reading means. As can be understood from FIGS. 4 and 5A, the direction D3 corresponds to the sub-scanning direction D1. The conveyance error and the movement error in the scanner are also collectively referred to as a reading error.

According to FIG. 5A, when the scan data 50 is viewed along the direction D3, a plurality of lines exist at any position. As a specific example, all of the image regions 51, 52, and 53 at different positions in the direction D3 indicated by a chain line in the scan data 50 include a plurality of lines having a common position in the sub-scanning direction D1 at the time of printing. The image region 51 includes a certain line 41*a* of the first line group 41 and a certain line 43*a* of the third line group 43. Similarly, the image region 52 includes one line 42*a* of the second line group 42 and one line 44*a* of the fourth line group 44. The image region 53 includes one line 41*a* of the first line group 41 and one line 43*a* of the third line group 43.

When the lines 41*a* and 43*a* included in the image region 51 are compared, it can be seen that both have the same thickness and are thick. The thickness of the line is a width in a direction intersecting the longitudinal direction of the line. Since the thickness of each line forming the test pattern 40 is known in design, the standard value of the thickness of each line forming the test pattern 40 is known in advance in the scan data 50 as well. Since the lines 41*a* and 43*a* included in the image region 51 are both thicker than the standard value, the image processing device determines that a conveyance error at the time of reading by the scanner appears in the image region 51, and corrects the image region 51. The correction on the image region 51 is a process of reducing in the direction D3 so that the thicknesses of the lines 41*a* and 43*a* become standard values. As a result, it is possible to avoid erroneous detection that the lines 41*a* and 43*a* included in the image region 51 are dot thickening.

When the lines 41*a* and 43*a* included in the image region 53 are compared, it can be seen that both have the same thickness and are thin. Since the lines 41*a* and 43*a* included in the image region 53 are both thinner than the standard value, the image processing device determines that a conveyance error at the time of reading by the scanner appears in the image region 53, and corrects the image region 53. The correction on the image region 53 is a process of enlarging in the direction D3 so that the thicknesses of the lines 41*a* and 43*a* become standard values. As a result, it is possible to avoid erroneous detection that the lines 41*a* and 43*a* included in the image region 53 are dot thinning.

Comparing the lines 42*a* and 44*a* included in the image region 52, the line 42*a* has a standard thickness, but the line 44*a* is thin. As described above, in a case where only some lines are thinner or thicker than the standard value when comparing the lines having substantially the same position in the direction D3, the ejection failure of the nozzle 20 is recognized. That is, the image processing device can determine that the cause of the thin line 44*a* included in the image region 52 is not the conveyance error at the time of reading but is the defect of the nozzle 20 used to form the line 44*a*, and thus, does not perform correction on the image region 52.

The image processing device can accurately detect the ejection failure of the nozzle 20 by analyzing and evaluating the scan data 50 after performing the necessary correction on the scan data 50 to remove the reading error.

Figure 6A:
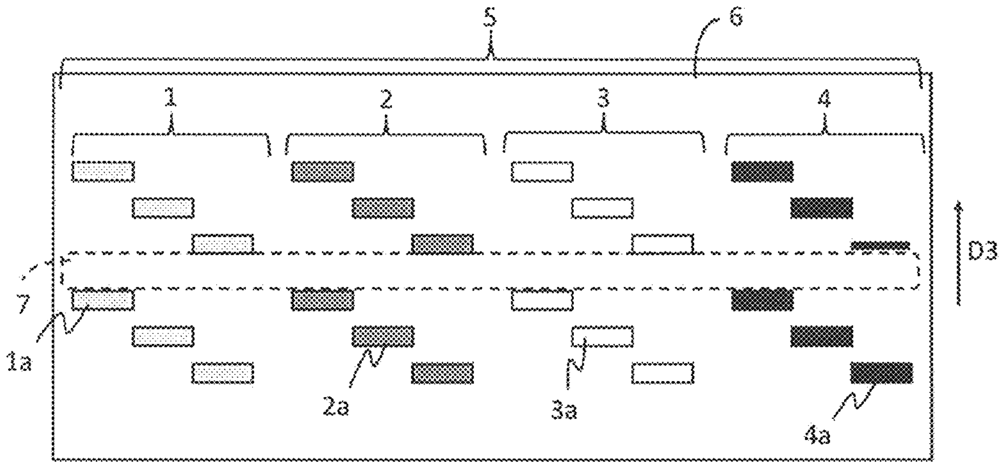
FIG. 6A is a diagram illustrating scan data of a known test pattern.

FIG. 6A illustrates scan data 6 of a medium on which a known test pattern 5 is printed. The view of FIG. 6A is the same as that of FIG. 5A. Typically, the test pattern 5 is printed on the medium by ejecting ink from each nozzle 20 of each nozzle row 26 by one pass of the print head 19 as illustrated in FIG. 2. In the test pattern 5, as can be seen from the scan data 6, the plurality of line groups 1, 2, 3, and 4 corresponding to the plurality of nozzle rows 26 are arranged in correspondence with the main scanning direction D2, and the plurality of line groups 1, 2, 3, and 4 are not shifted from each other in the sub-scanning direction D1. Each of the line groups 1, 2, 3, 4 is configured by a plurality of lines 1*a*, 2*a*, 3*a*, and 4*a*. The plurality of lines 1*a* forming the line group 1, the plurality of lines 2*a* forming the line group 2, the plurality of lines 3*a* forming the line group 3, and the plurality of lines 4*a* forming the line group 4 are arranged at intervals corresponding to the nozzle intervals NP in the sub-scanning direction D1. Therefore, in the test pattern 5, a region where nothing is printed is generated in the sub-scanning direction D1.

The region 7 in the scan data 6 is one of the reading results corresponding to a region where nothing is printed in the sub-scanning direction D1. The width of the region 7 in the direction D3 is thicker than the width of the region between the other lines of the scan data 6 in the direction D3. However, since no pattern is formed in the region 7, evaluation is impossible. That is, it is not possible to determine whether the width of the region 7 is increased due to a conveyance error at the time of reading of the test pattern 5 by the scanner or the width of the region 7 is increased due to an ejection failure of the nozzle 20 such as a dot landing position shift or dot thinning. Therefore, correct correction cannot be performed on the scan data 6 including the region 7, and it is difficult to improve the accuracy of detecting the ejection failure of the nozzle 20 from the scan data 6.

To solve such a problem, according to the present embodiment, as illustrated in FIGS. 4 and 5A, a region where nothing is printed is not generated in the sub-scanning direction D1 in the test pattern 40, or is hardly generated as compared with the related art. Therefore, the necessity of correction of the scan data 50 can be determined based on the comparison between the lines belonging to different line groups as described above, and the scan data 50 can be appropriately corrected.

Figure 6B:
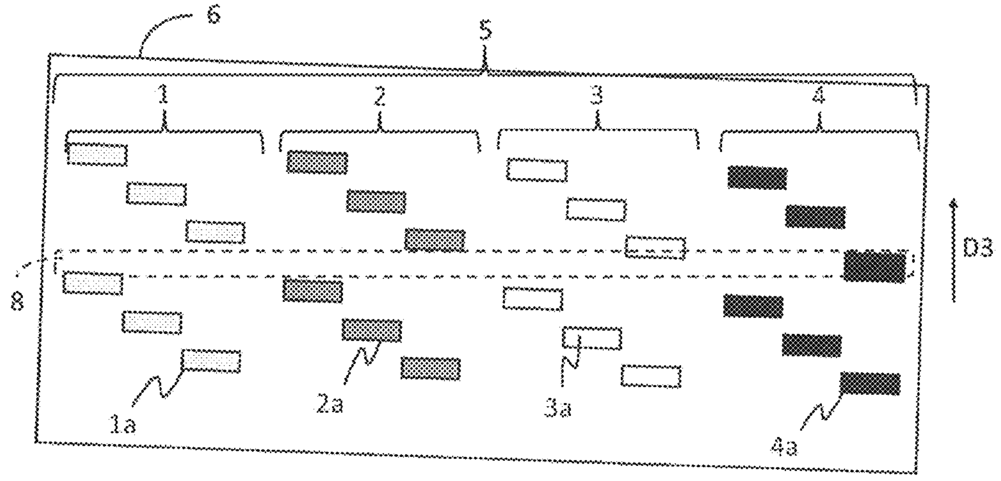
FIG. 6B is a diagram illustrating inclined scan data of the known test pattern.

FIG. 6B illustrates scan data 6 of a medium on which a known test pattern 5 is printed. However, FIG. 6B illustrates an example of the scan data 6 obtained when the document is conveyed in an inclined state at the time of reading by the scanner. Since the test pattern 5 has a low line forming frequency in the sub-scanning direction D1, when the document is inclined during conveyance at the time of reading, a state in which lines having a common position in the direction D3 cannot be compared easily occurs in the scan data 6. For example, the region 8 in the scan data 6 only includes one line 4*a* forming the line group 4. Therefore, there is no comparison target for the line 4*a* in the region 8, and it is not possible to determine whether ejection failure such as dot thickening has occurred or the influence of the conveyance error has appeared in the region 8 by viewing the line 4*a*.

Figure 5B:
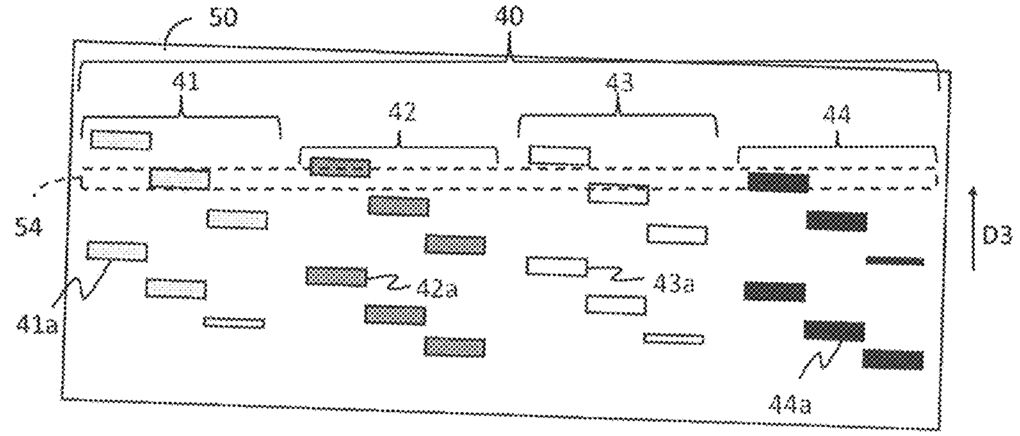
FIG. 5B is a diagram illustrating inclined scan data of the test pattern according to the present embodiment.

On the other hand, FIG. 5B illustrates an example of the scan data 50 of the medium 30 on which the test pattern 40 is printed, which is the scan data 50 obtained when the document is conveyed in an inclined state at the time of reading by the scanner. In the test pattern 40 of the present embodiment, since the line forming frequency in the sub-scanning direction D1 is higher than in the related art, even if the document is inclined during conveyance at the time of reading, a state in which lines having a common position in the direction D3 cannot be compared with each other is less likely to occur in the scan data 50. For example, the image region 54 at a certain position in the direction D3 substantially includes one line 41*a* forming the first line group 41 and one line 44*a* forming the fourth line group 44. Therefore, by comparing these two lines 41*a* and 44*a*, it is possible to determine whether ejection failure such as dot thickening or dot thinning has occurred in one of the lines or whether the influence of the conveyance error has appeared in the region 54. As described above, it can be said that the test pattern 40 improves the detection accuracy of the ejection failure of the nozzle 20 as compared with the related art even when the document is inclined during conveyance at the time of reading.

4. Conclusion

As described above, according to the present embodiment, the printing device 10 includes the print head 19 in which the first nozzle row, the second nozzle row, the third nozzle row, and the fourth nozzle row, which are the nozzle rows 26 in which the plurality of nozzles 20 that eject liquid are arranged in the first direction at the predetermined nozzle interval NP, are arranged along the second direction intersecting the first direction, the carriage 18 on which the print head 19 is mounted and configured to reciprocate along the second direction, the moving unit that performs relative movement between the medium 30 and the print head 19 in the first direction, and the control unit 11 that causes the print head 19 to eject liquid from the nozzle 20 to the medium 30 to print the test pattern 40. The test pattern 40 is printed by main scan in which the print head 19 ejects liquid from the nozzle 20 along with the movement of the carriage 18 along the second direction, and sub-scan which is the relative movement in the first direction. The control unit 11 includes a first line group formed by a first nozzle row, a second line group formed by a second nozzle row, a third line group formed by a third nozzle row, and a fourth line group formed by a fourth nozzle row, which are line groups having a plurality of lines formed by liquid ejection from each of the nozzles 20 of the nozzle row 26, and prints the test pattern 40 such that the first line group and the third line group, and the second line group and the fourth line group are shifted by a first distance L shorter than the nozzle interval NP in the first direction, and the first line group and the third line group overlap each other and the second line group and the fourth line group overlap each other when viewed from the second direction.

According to the above configuration, the test pattern 40 is printed such that the first line group and the third line group are shifted from the second line group and the fourth line group by the first distance L in the first direction, and the first line group and the third line group overlap each other and the second line group and the fourth line group overlap each other when viewed from the second direction. Therefore, as compared with the known test pattern, the forming frequency of the lines configuring the test pattern 40 in the first direction increases, and the lines can be compared at each position in the first direction. As a result, assuming that the printed test pattern 40 is read and the ejection failure of the nozzle 20 is detected based on the scan data, the test pattern 40 contributes to optimization of correction of the scan data and improvement of detection accuracy of the ejection failure.

According to the present embodiment, the control unit 11 may print the test pattern 40 with the first distance L as a distance of half of the nozzle interval NP.

According to the above configuration, the region where the line is not printed in the first direction can be minimized most efficiently.

However, the disclosure range of the present embodiment merely needs to be NP>L, and the disclosure range may not be narrowed to NP/2=L.

Furthermore, according to the present embodiment, the printing device 10 prints the test pattern 40 by two main scans and one sub-scan executed between the two main scans.

The test pattern 40 can be printed in four passes according to the number of line groups, for example, but according to the above configuration, the test pattern 40 is printed with the minimum pass number. As a result, it is possible to minimize the influence on the printing result due to the error at the time of printing such as the error of the printing position for each pass and the conveyance error of the medium 30. Furthermore, the test pattern 40 can be printed in as short a time as possible.

Furthermore, according to the present embodiment, the control unit 11 may control the print head 19 to form the lines formed by the nozzles 20 adjacent to each other in the first direction within the nozzle row 26 to be shifted in the second direction.

According to the above configuration, since each line forming the test pattern 40 is formed to be shifted in each of the first direction and the second direction, it is easy to recognize each line.

However, the disclosure of the present embodiment also includes a mode in which the lines formed by the nozzles 20 belonging to the common nozzle row 26 and adjacent in the first direction are formed at the same position in the second direction.

Note that, in the scope of the claims, only some of the combinations of the claims are described. However, as a matter of course, the present embodiment includes various combinations of the plurality of dependent claims, as well as one-to-one combinations of the independent claims and the dependent claims.

In addition to the printing device 10, the present embodiment discloses the printing method and the program 12 for executing the printing method in cooperation with a processor. That is, a printing method for printing a test pattern 40 by causing a print head 19 having a nozzle row 26 in which a plurality of nozzles 20 that eject liquid are arranged in a first direction at a predetermined nozzle interval NP to eject liquid from the nozzles 20 to a medium 30, in which in the print head 19, a first nozzle row, a second nozzle row, a third nozzle row, and a fourth nozzle row, which are the nozzle rows 26, are arranged along a second direction intersecting the first direction, the printing method includes a printing step of printing the test pattern 40 by main scan in which the print head 19 moving along the second direction ejects liquid from the nozzles 20 and sub-scan that is a relative movement between the medium 30 and the print head 19 in the first direction, and the printing step includes a first line group formed by a first nozzle row, a second line group formed by a second nozzle row, a third line group formed by a third nozzle row, and a fourth line group formed by a fourth nozzle row, which are line groups having a plurality of lines formed by liquid ejection from each nozzle of the nozzle row 26, and print the test pattern 40 so that the first line group and the third line group are shifted from the second line group and the fourth line group by a first distance L shorter than the nozzle interval NP in the first direction, and the first line group and the third line group overlap each other and the second line group and the fourth line group overlap each other when viewed from the second direction.

5. Additional Description

In the print head 19, n nozzle rows 26 including a first nozzle row, a second nozzle row, a third nozzle row, and a fourth nozzle row are arranged along the second direction. In other words, n may be 4 or an integer greater than 4. For example, if the print head 19 is a head that ejects each ink of light cyan and light magenta in addition to CMYK, the print head 19 includes a total of six nozzle rows 26 corresponding to six colors. In addition, the print head 19 may include each nozzle row 26 for ejecting various types of ink, for example, matte black, gray, orange, green, violet, and the like. Of course, the print head 19 may include two or more nozzle rows 26 for ink of one color. In the configuration in which the number of nozzle rows 26 is larger than 4, the nozzle rows 26 as shown in FIGS. 2 and 4 are merely added along the main scanning direction D2 in the print head 19, and thus illustration will be omitted.

In the printing step of the test pattern, in a case where the test pattern 40 having n line groups is printed by causing each of the n nozzle rows 26 to form the line group, the control unit 11 prints the test pattern 40 such that if n is an even number, n/2 line groups of the n line groups and the remaining line groups are shifted by the first distance L in the first direction, and prints the test pattern 40 such that if n is an odd number, n/2±1 line groups of the n line groups and the remaining line groups are shifted by the first distance L in the first direction.

Figure 7:
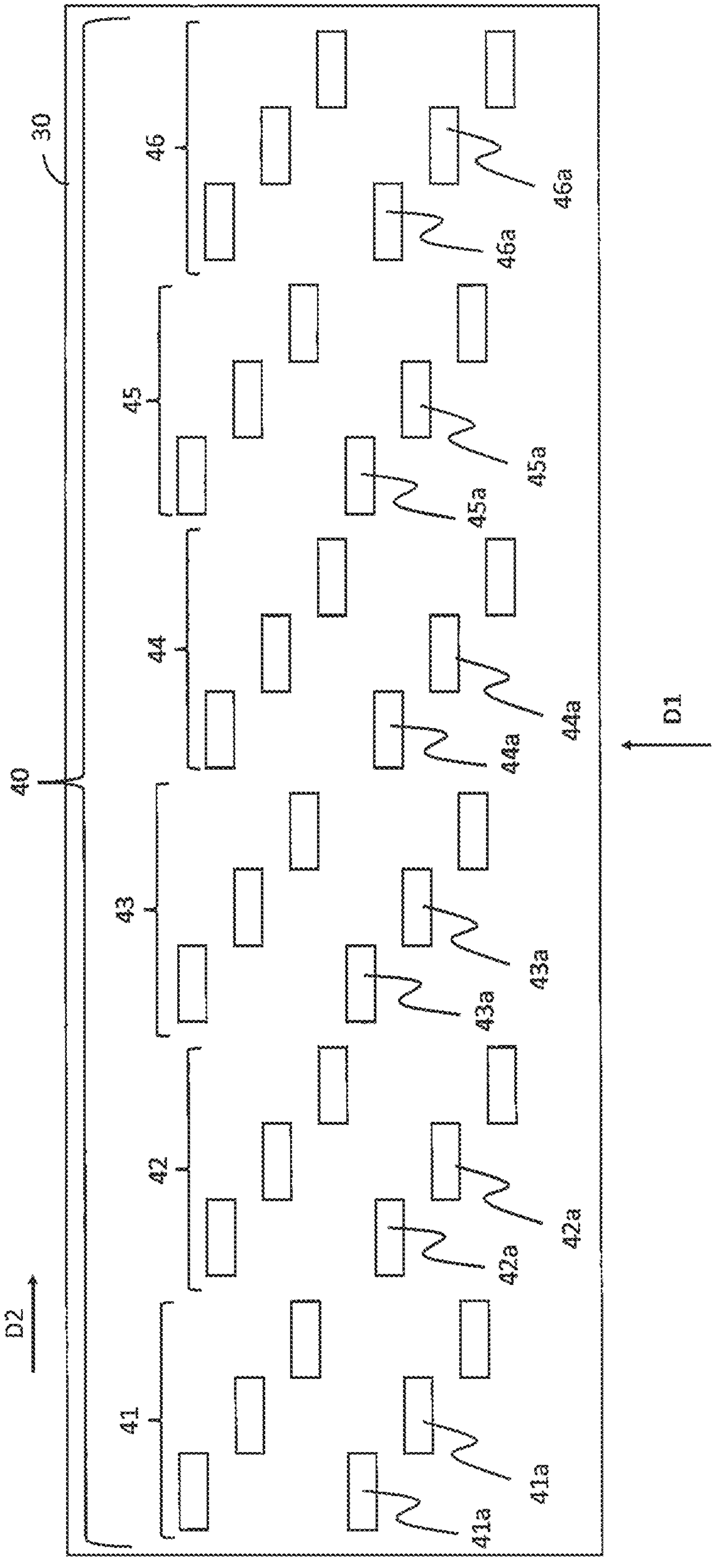
FIG. 7 is a diagram illustrating an example different from FIG. 4, which is a test pattern of the present embodiment.

FIG. 7 illustrates an example that differs from FIG. 4 in the test pattern 40 printed on the medium 30 as a result of steps S100 to S120. With respect to FIG. 7, it is assumed that n=6 and the print head 19 includes a fifth nozzle row and a sixth nozzle row in addition to the first to fourth nozzle rows as the plurality of nozzle rows 26. The first to fourth line groups 41, 42, 43, and 44 are as described above. However, in FIG. 7, a difference in color between line groups is not represented.

In the first pass of step S100, the control unit 11 forms the first line group 41, the third line group 43, and the fifth line group 45 on the medium 30 by causing each of the first nozzle row, the third nozzle row, and the fifth nozzle row to eject ink from each nozzle 20. The fifth line group 45 is a set of a plurality of lines 45*a* formed by each nozzle 20 of the fifth nozzle row ejecting ink. In the second pass of step S120 after step S110, the control unit 11 causes each of the second nozzle row, the fourth nozzle row, and the sixth nozzle row to eject ink from each nozzle 20 to form the second line group 42, the fourth line group 44, and the sixth line group 46 on the medium 30. The sixth line group 46 is a set of a plurality of lines 46*a* formed by each nozzle 20 of the sixth nozzle row ejecting ink. When viewed from the main scanning direction D2, the test pattern 40 is printed such that the first line group, the third line group, and the fifth line group overlap each other, and the second line group, the fourth line group, and the sixth line group overlap each other.

Furthermore, it is assumed that n=5, and the print head 19 includes a fifth nozzle row in addition to the first to fourth nozzle rows as the plurality of nozzle rows 26. In this case, for example, the control unit 11 may form the second line group 42 and the fourth line group 44 on the medium 30 by executing the same process as in the case of n=6 in the first pass of step S100 and causing each of the second nozzle row and the fourth nozzle row to eject ink from each nozzle 20 in the second pass of step S120. The test pattern 40 when n=5 is a content obtained by simply eliminating the sixth line group 46 from the test pattern 40 of FIG. 7, and thus illustration will be omitted. Of course, when n=5, the control unit 11 may cause two line groups to be formed by the two nozzle rows 26 in the first pass of step S100, and may cause three line groups to be formed by the three nozzle rows 26 in the second pass of step S120.

In this manner, the control unit 11 brings the number of line groups as close as possible between the plurality of line groups including the first line group 41 and the third line group 43 and the plurality of line groups including the second line group 42 and the fourth line group 44 formed to be shifted by the first distance L in the sub-scanning direction D1. As a result, in the printed test pattern 40, the same number of lines can be compared at any position in the sub-scanning direction D1, and the detection accuracy of the ejection failure of the nozzle 20 can be improved.

However, the disclosure of the present embodiment also includes a configuration in which the number of line groups is biased to one of a plurality of line groups including the first line group 41 and the third line group 43 and a plurality of line groups including the second line group 42 and the fourth line group 44 formed to be shifted by the first distance L in the sub-scanning direction D1. For example, when n=6, four line groups may be formed by the four nozzle rows 26 in the first pass, and two line groups may be formed by the remaining two nozzle rows 26 in the second pass.

The inclination of the test pattern described in FIGS. 5B and 6B may be understood as not the inclination caused by the conveyance when the scanner reads the document but the inclination caused by the conveyance by the conveying unit 17 when the printing device 10 prints the test pattern. That is, when the printing device 10 prints a test pattern on the medium 30 inclined with respect to the sub-scanning direction D1, and the scanner reads the medium 30 on which the test pattern is printed as a document while conveying the same, scan data representing the test pattern in a state inclined within a frame of a non-inclined rectangular document may be obtained.

What is claimed is:

1. A printing device, comprising:

a print head including a first nozzle row, a second nozzle row, a third nozzle row, and a fourth nozzle row which are nozzle rows including a plurality of nozzles configured to eject liquid and arrayed in a first direction at a predetermined nozzle interval, and are arranged along a second direction intersecting the first direction;

a carriage provided with the print head and configured to reciprocate along the second direction;

a moving unit configured to perform relative movement between a medium and the print head in the first direction; and a control unit configured to cause the print head to eject liquid from the plurality of nozzles to the medium to print a test pattern, wherein the test pattern is printed by a main scan by the print head ejecting liquid from the plurality of nozzles along with the movement of the carriage along the second direction and a sub-scan that is the relative movement in the first direction, the control unit is configured to print the test pattern so as to include a first line group formed by the first nozzle row, a second line group formed by the second nozzle row, a third line group formed by the third nozzle row, and a fourth line group formed by the fourth nozzle row which are line groups including a plurality of lines formed by liquid ejection from each of the plurality of nozzles of the nozzle rows, and the control unit is configured to print the test pattern by executing a first pass of the main scan in which the first line group and the third line group are formed and the second line group and the fourth line group are not formed, by executing the sub-scan by a first distance shorter than the nozzle interval subsequent to the executing of the first pass, and by executing a second pass of the main scan in which the second line group and the fourth line group are formed and the first line group and the third line group are not formed such that the first line group and the third line group are shifted from the second line group and the fourth line group in the first direction by the first distance shorter than the nozzle interval, and the first line group and the third line group overlap and the second line group and the fourth line group overlap when viewed from the second direction.

2. The printing device according to claim 1, wherein the control unit is configured to print the test pattern with the first distance being half of the nozzle interval.

3. The printing device according to claim 1, wherein the print head includes n rows of the nozzle rows including the first nozzle row, the second nozzle row, the third nozzle row, and the fourth nozzle row and being arranged along the second direction, when each of the n rows of the nozzle rows is formed with the line group to print the test pattern including n line groups, the control unit is configured to, print the test pattern such that n/2 line groups out of the n line groups and the line groups other than the n/2 line groups out of the n line groups are shifted from each other by the first distance in the first direction, when n is an even number, and print the test pattern such that n/2±1 line groups out of the n line groups and the line groups other than the n/2±1 line groups out of the n line groups are shifted from each other by the first distance in the first direction, when n is an odd number.

4. The printing device according to claim 1, wherein the printing device is further configured to print the test pattern by performing the main scan twice and performing the sub-scan once executed between the main scans performed twice.

5. The printing device according to claim 1, wherein the control unit controls the print head such that the lines formed by the nozzles adjacent in the first direction within the nozzle row are formed so as to be shifted from each other in the second direction.

6. A printing method for printing a test pattern by causing a print head that includes nozzle rows including a plurality of nozzles configured to eject liquid and arrayed in a first direction at a predetermined nozzle interval, to eject liquid from the plurality of nozzles onto a medium, the print head including a first nozzle row, a second nozzle row, a third nozzle row, and a fourth nozzle row which are the nozzle rows and arranged along a second direction intersecting the first direction;

the printing method comprising:

a printing step of printing the test pattern by a main scan by the print head moving along the second direction and ejecting liquid from the plurality of nozzles and a sub-scan that is relative movement between the medium and the print head in the first direction; and the printing step including, printing the test pattern so as to include a first line group formed by the first nozzle row, a second line group formed by the second nozzle row, a third line group formed by the third nozzle row, and a fourth line group formed by the fourth nozzle row which are line groups including a plurality of lines formed by liquid ejection from each of the plurality of nozzles of the nozzle rows, and printing the test pattern by executing a first pass of the main scan in which the first line group and the third line group are formed and the second line group and the fourth line group are not formed, by executing the sub-scan by a first distance shorter than the nozzle interval subsequent to the executing of the first pass, and by executing a second pass of the main scan in which the second line group and the fourth line group are formed and the first line group and the third line group are not formed such that the first line group and the third line group are shifted from the second line group and the fourth line group in the first direction by the first distance shorter than the nozzle interval, and the first line group and the third line group overlap and the second line group and the fourth line group overlap when viewed from the second direction.

* * * * *